Oct. 8, 1940.    C. J. WHITACRE    2,217,086
VEHICLE WHEEL
Filed Jan. 2, 1936
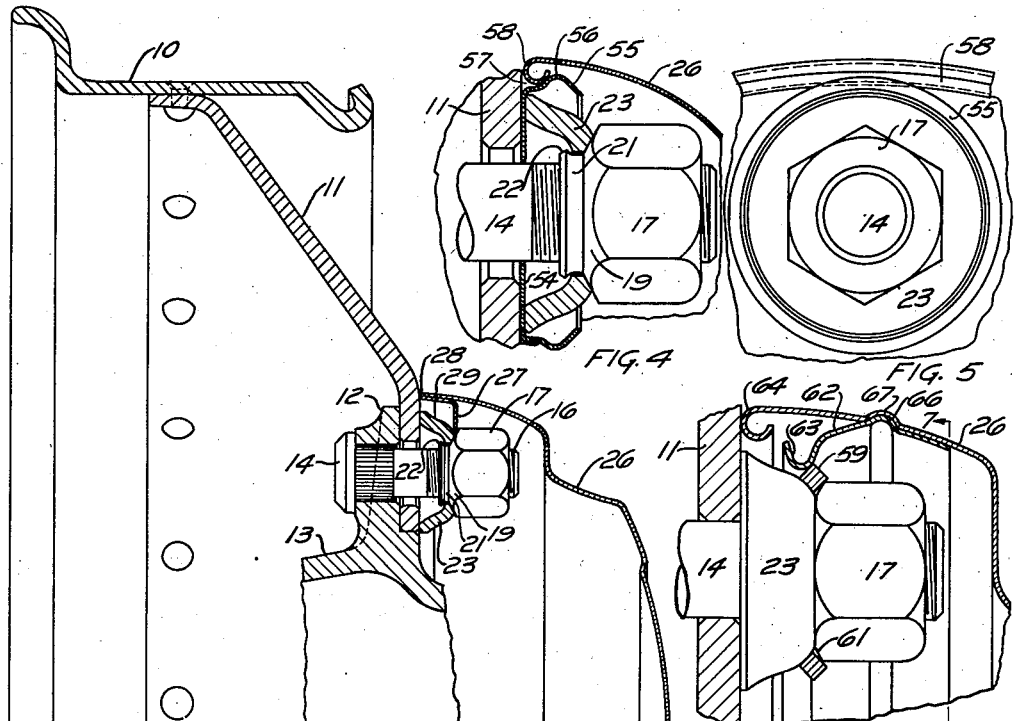
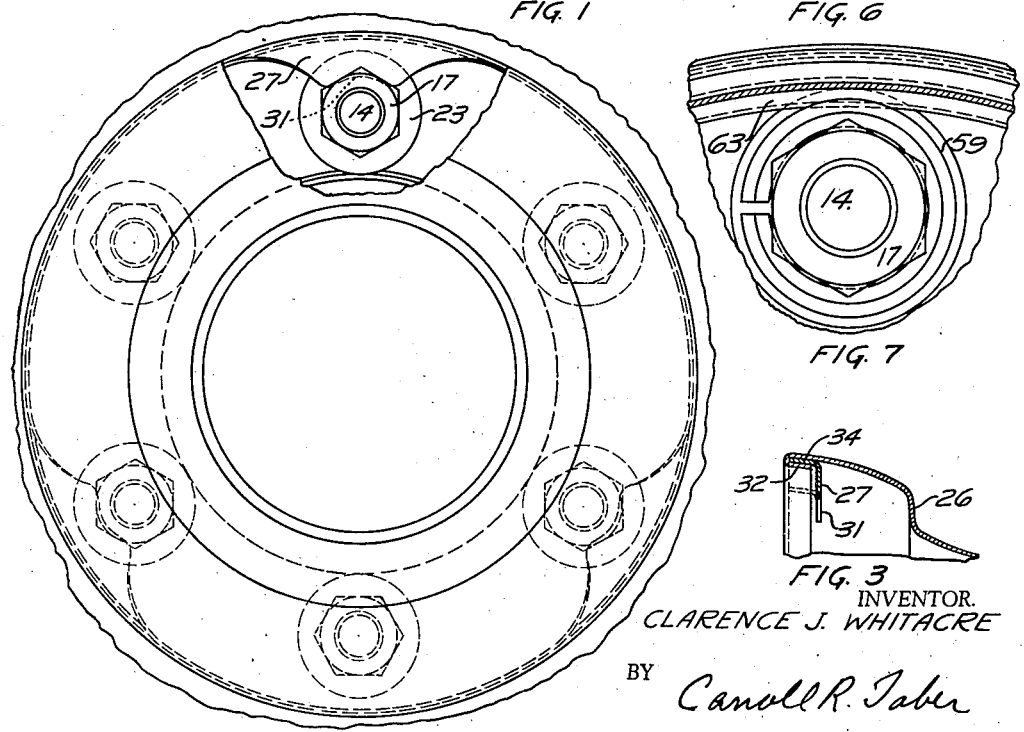
INVENTOR.
CLARENCE J. WHITACRE
BY
*Carroll R. Taber*
ATTORNEY.

Patented Oct. 8, 1940

2,217,086

UNITED STATES PATENT OFFICE 2,217,086

VEHICLE WHEEL

Clarence J. Whitacre, St. Louis, Mo., assignor to Motor Wheel Corporation, Lansing, Mich., a corporation of Michigan Application January 2, 1936, Serial No. 57,136

4 Claims. (Cl. 301—108)

This invention relates to vehicle wheels and particularly to metallic wheels for use on automotive vehicles.

The subject of the invention is to provide means for attaching a hub cap to a vehicle wheel, and specifically to provide an attaching means which is removably associated with the mounting stud bolt and nut.

In the drawing,

Figure 1 is a fragmentary vertical sectional view of a vehicle wheel embodying one form of the present invention;

Figure 2 is a fragmentary front elevational view of the wheel shown in Figure 1;

Figure 3 is a sectional view of a constructional variation of the embodiment shown in Figures 1 and 2;

Figure 4 is a vertical sectional view of another form the invention may assume;

Figure 5 is a view taken substantially on the line 5—5 of Figure 4;

Figure 6 is a vertical sectional view of another embodiment of the invention; and Figure 7 is a front elevational view of the embodiment shown in Figure 6 taken on line 7—7.

Referring now to the drawing and to Figures 1 and 2 thereof, a conventional wheel structure is shown comprising a tire-retaining rim 10, mounted on the periphery of a wheel body 11. The bolting-on flange of the wheel body is secured in over lapping relation to the outboard side of the radial flange 12 of a wheel hub 13 by the usual mounting stud bolts 14 which are provided with threads 16 to receive nuts 17 for securing the parts together.

Each of the nuts 17 is provided with a taper 19 and a shoulder 21 having a flange 22 on the inner end thereof forming a collar upon which is mounted a washer clamp 23 extending inwardly from the nut to engage the bolting-on flange of wheel 11. Thus, when the nuts 17 are tightened on the mounting studs 14, the washer clamps 23 tightly engage the bolting-on flange of wheel 11 to secure the wheel body in position upon the hub.

In accordance with the objects of the present invention, it is desirable to attach a hub cap 26 to the wheel assembly by means removably associated with the nut and washer clamp assemblies to be held in place when the nut is in position upon the stud-bolt 14. To this end a hub cap attaching member is shown in Figures 1 and 2 which comprises a plurality of radially inwardly extending resilient flanges 27 formed on the hub cap 26 and which are spaced in corresponding relation to the stud-bolts 14 and adapted to cooperate with the nuts 17 and washers 23 to maintain the hub cap in position upon the wheel. These flanges may be formed by bending the peripheral edge 28 of the hub cap back upon itself in an axial direction a distance equal to the distance between the tapers 19 of the nuts 17 and the bolting-on flange 11 as at 29 and then bending the free ends radially inwardly. The inner free edges of the flanges 27 may be arcuately formed as at 31 to substantially conform to the surface contour of the tapers 19 of the nuts.

The hub cap thus formed may be secured to the wheel by positioning the flanges 27 between the stud-bolts and then rotating it until the flanges snap over the nuts. In this manner, the hub cap is held securely in place due to the fact that the peripheral edge thereof engages the central portion of the wheel body and the resilient flanges 27 engage the tapers 19 of the nuts.

As shown in Figure 3, the flanges may be separately formed and welded or otherwise secured between the turned-back edge 32 of the hub cap and the body thereof as at 34.

As shown in Figures 4 and 5, the hub cap attaching member comprises a washer 54 surrounding each of the stud-bolts and positioned between the washer clamp 23 and the bolting-on flange of wheel body 11. The attaching washer 54 is provided with a peripheral flanged portion 55 extending toward the outboard side of the wheel and which in turn is provided with a raised bead 56 thereon in axially spaced relation to the bolting-on flange of wheel body 11 forming a space 57 to receive the bead 58 of the hub cap 26. The washer 54 may, if desired, be arranged to effect an interlocking engagement with the clamp 23 so that it may be removed and installed with the latter as a unit.

In Figures 6 and 7 a square, split ring 59 is seated in the V-shaped groove 61 formed between the nut 17 and the washer 23, with one corner thereof projecting substantially radially outwardly to be engaged by a separate, resilient flange 62 secured to the hub cap which in turn is provided with a bead 63 on the free edge thereof. In this embodiment of the invention, the peripheral edge of the hub cap 26 is provided with a resilient bead 64 to engage the bolting-on flange of wheel body 11, and the flange 62 may be secured to the hub cap 26 at a point axially spaced from the edge thereof by welding or otherwise securing a bead 66 formed thereon within an annular channel 67 formed in the hub cap wall.

With the construction just described, the split rings 59 may be sprung and slipped over the nuts 17 and will resume their normal shape to seat securely in the grooves 61 between the nuts and washers 23.

It will be apparent to those skilled in the art that each of the embodiments of the invention as shown and described may be varied considerably in construction and design without departing from the spirit or scope of the invention which is limited only by the appended claims.

What is claimed and desired to be secured by Letters Patent is:

1. A vehicle wheel including, in combination, a hub, a wheel body mounted on said hub and secured thereto by a plurality of securing bolt assemblies, each securing bolt assembly including a nut and a bolt, annular members surrounding at least some of said bolts and being clamped against the wheel body by the nuts, each of said annular members being independent of all of the other annular members, and a cover arranged to conceal all of said securing bolt assemblies, said cover including resilient means adapted to be sprung into engagement with said annular members to detachably connect the cover thereto.

2. A vehicle wheel including, in combination, a hub, a wheel body mounted on the hub and secured thereto by a plurality of securing bolt assemblies, each securing bolt assembly including a nut and a bolt, cover attaching members surrounding at least some of said bolts and being clamped against the wheel body by the nuts, each of said cover attaching members being independent of all of the other cover attaching members, and a cover arranged to conceal all of said securing bolt assemblies, said cover including means adapted to be sprung into engagement with said annular members to detachably connect the cover thereto.

3. A vehicle wheel including, in combination, a hub, a wheel body secured to the hub by a plurality of securing bolt assemblies, cover fastening means detachably connected to certain of said securing bolt assemblies, each of said cover fastening means being independent of the other fastening means and spaced axially outwardly from the wheel body, and a cover arranged to conceal the securing bolt assemblies and the fastening means, said cover including a peripheral portion adapted to be sprung into engagement with said cover fastening means to detachably connect the cover to the wheel.

4. A vehicle wheel including, in combination, a hub, a wheel body mounted on the hub and secured thereto by a plurality of securing bolt assemblies, annular members surrounding at least some of said securing bolt assemblies, and being clamped thereby against the wheel body, each of said annular members being independent of all of the other annular members, and a cover arranged to conceal all of said securing bolt assemblies, said cover including resilient means adapted to be sprung into engagement with said annular members to detachably connect the cover thereto.

CLARENCE J. WHITACRE.